US008654178B2

(12) United States Patent
Ueda

(10) Patent No.: US 8,654,178 B2
(45) Date of Patent: Feb. 18, 2014

(54) VIDEO RECORDING APPARATUS AND VIDEO REPRODUCING APPARATUS

(75) Inventor: Hisataka Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 425 days.

(21) Appl. No.: 13/018,513

(22) Filed: Feb. 1, 2011

(65) Prior Publication Data

US 2011/0187823 A1    Aug. 4, 2011

(30) Foreign Application Priority Data

Feb. 2, 2010   (JP) ................................ 2010-020864

(51) Int. Cl.
*G03B 37/04*    (2006.01)
*G01B 11/02*    (2006.01)
*H04N 7/50*    (2006.01)

(52) U.S. Cl.
USPC .................. 348/38; 348/43; 348/47; 348/48; 348/49; 348/50; 348/139; 375/240.01; 375/260

(58) Field of Classification Search
USPC ................... 348/38, 43, 47–50, 139
See application file for complete search history.

(56) References Cited

U.S. PATENT DOCUMENTS 7,679,616 B2 *  3/2010  Nomura et al. ............... 345/419
2006/0153289 A1 *  7/2006  Choi et al. ............... 375/240.01

FOREIGN PATENT DOCUMENTS

JP   4-40184   2/1992
WO   03/092304   11/2003

* cited by examiner

*Primary Examiner* — Joseph Ustaris
*Assistant Examiner* — Maryam Nasri
(74) *Attorney, Agent, or Firm* — Panasonic Patent Center

(57) ABSTRACT

A video recording apparatus is configured to record, onto a recording medium, a layered data structure containing data sets. Each of the data sets includes a plurality of channels of data elements. Each of the data elements includes video data and/or the like. An input unit is configured to receive a plurality of channels of video data. The plurality of channels correspond to each other. An information generation unit is configured to generate additional information to be added to each of the data elements in at least two layers of the data structure. An adding unit is configured to add the additional information to each of the data elements so that the data elements included in each of the data sets are associated with each other. A recording unit is configured to record the data structure in which the additional information has been added to each of the data elements onto the recording medium.

13 Claims, 15 Drawing Sheets

VIDEO RECORDING APPARATUS AND VIDEO REPRODUCING APPARATUS

CROSS-REFERENCE TO RELATED APPLICATIONS

This application claims priority to Japanese Patent Application No. 2010-020864 filed on Feb. 2, 2010. The entire disclosure of Japanese Patent Application No. 2010-020864 is hereby incorporated herein by reference.

BACKGROUND

1. Technical Field

The technology disclosed herein relates to a video recording apparatus configured to record a plurality of channels of video data in a manner to associate the plurality of channels of video data with each other for these channels, and a video reproducing apparatus configured to reproduce a plurality of channels of video data that have been recorded in a manner to be associated with each other for different channels.

2. Background Information

Multipoint shooting, such as three-dimensional shooting, uses a plurality of pieces of video data obtained through different channels. As the video processing technology advances, techniques for processing such multiple-channel video data have become common. The visual reality of images can be improved with these techniques. In three-dimensional shooting, for example, a plurality of pieces of video data are obtained using a twin-lens camera or two cameras. The obtained two-channel video data is then subjected to video processing to form a three-dimensional video. To subject such multiple-channel video data (for example, two pieces of video data obtained and recorded simultaneously using two cameras in three-dimensional shooting) to video processing, the pieces of video data obtained through the different channels need to be associated with each other for the channels in an appropriate manner.

With one method, a plurality of data elements (materials) forming video data may be associated with each other using identifiers unique to the data elements. For example, International Publication No. 2003/092304 describes a technique used for a video recording apparatus that records a plurality of pieces of video data obtained at multiple points onto a single medium. With the technique described in International Publication No. 2003/092304, different IDs corresponding to reference points that have been used to obtain the plurality of pieces of video data are added to the pieces of video data.

To reproduce, edit, or process a plurality of pieces of video data simultaneously, a plurality of video outputs may be synchronized with each other using information for synchronization, such as time codes. With a method described in Japanese Unexamined Patent Publication No. H4-040184, for example, time codes for synchronizing fames of video data are multiplexed with compressed image data for divisional images and recorded together with the image data. When video data is reproduced, a plurality of video outputs are synchronized with each other by referring to the multiplexed time codes.

Among various data elements such as files, the above conventional structure fails to easily specify, when reproducing video data, data elements that correspond to each other (for example, files recorded at the same timing in a synchronized manner). As a result, the conventional structure requires complicated processing for reproducing video data.

SUMMARY

It is an object of the technology disclosed herein to provide a video recording apparatus and a video reproducing apparatus with which a plurality of data elements (materials) are easily associated with each other for different channels when reproducing a plurality of channels of video data.

The video recording apparatus disclosed herein includes an input unit, an information generation unit, an adding unit, and a recording unit. The video recording apparatus is configured to record a layered data structure containing data sets onto a recording medium. Each of the data sets includes a plurality of channels of data elements. Each of the data elements includes at least one of video data and management information for the video data. The input unit is configured to receive a plurality of channels of video data. The plurality of channels correspond to each other. The information generation unit is configured to generate additional information to be added to each of the data elements in at least two layers of the data structure. The adding unit is configured to add the additional information to each of the data elements so that the data elements included in each of the data sets are associated with each other. The recording unit is configured to record, onto the recording medium, the data structure in which the additional information has been added to each of the data elements.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1. Structure of Video Recording Apparatus

Figure 1:
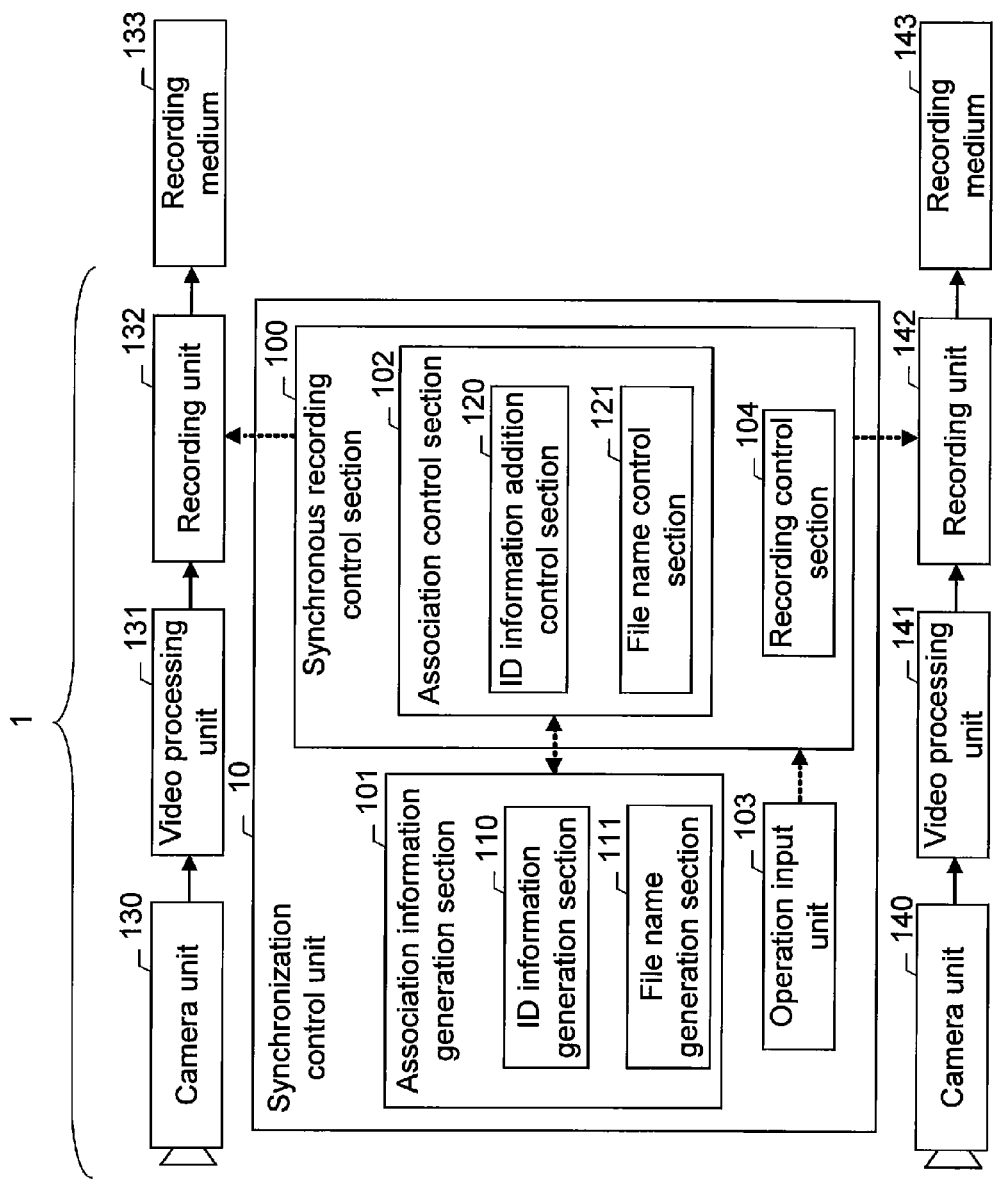
FIG. 1 is a block diagram showing the structure of a video recording apparatus according to a first embodiment.

As shown in FIG. 1, a video recording apparatus 1 includes a synchronization control section 10, two camera units 130 and 140, two video processing units 131 and 141, and two recording units 132 and 142. The recording unit 132 is connected to the recording medium 133, and the recording unit 142 is connected to the recording medium 143. The video recording apparatus 1 has two channels on each of which the processing from shooting a subject to recording the obtained video onto a recording medium is performed. One channel includes the camera unit 130, the video processing unit 131, and the recording unit 132. The other channel includes the camera unit 140, the video processing unit 141, and the recording unit 142. In the present embodiment, the video recording apparatus 1 is specifically a twin-lens camera recorder including two cameras and capable of performing three-dimensional shooting. This type of camera recorder can be for consumer use, or specifically be used by general consumers, or can be for professional use, or specifically be used by video creation businesses and video system businesses. This type of camera recorder can be used to create three-dimensional videos or three-dimensional movies.

Video data obtained by the camera unit 130 is processed through the video processing unit 131, and is recorded onto the removable recording medium 133 by the recording unit 132. Video data obtained by the camera unit 140 is processed through the video processing unit 141, and is recorded onto the removable recording medium 143 by the recording unit 142. In another embodiment, recording media 133 and 143 may be built in the video recording apparatus 1. The editing operation can be subsequently performed using the video data recorded on the recording media 133 and 143, and additionally using other video data when required. Through this editing operation, the video data is reconstructed to be three-dimensional video data. A video reproducing apparatus reproduces the three-dimensional video data and displays the resulting three-dimensional video on, for example, a monitor that is capable of displaying three-dimensional videos.

The components of the video recording apparatus 1 shown in FIG. 1 will now be described in detail.

The camera units 130 and 140 shoot a subject and obtain video data for the subject. The camera units 130 and 140 provide the obtained video data to the corresponding video processing units 131 and 141.

The video processing units 131 and 141 subject the video data, which has been provided from the camera units 130 and 140, to video processing including compression coding. The video processing units 131 and 141 provide the processed video data to the corresponding recording units 132 and 142. The compression coding may comply with, for example, MPEG-2 (MPEG: Moving Picture Experts Group) and MPEG-4 Part 10/AVC (Advanced Video Coding), which are widely used standards, or with, for example, SMPTE-314M (DV-Based 25M) (SMPTE: Society of Motion Picture and Television Engineers), which is a professional digital VTR (Video Tape Recorder) standard.

The recording units 132 and 142 record video data files and management information files onto the corresponding recording media 133 and 143 in accordance with control information provided from the synchronization control section 10. The generated video data file stores the processed video data that is provided from the video processing units 131 and 141. The management information file stores information for managing video data (hereafter referred to as "management information"). The management information includes information for managing media for storing video data (including the recording media 133 and 143).

The recording media 133 and 143 are semiconductor memories that can be accessed randomly. In another embodiment, the recording media 133 and 143 may be other randomly accessible media, such as hard disk drives or optical discs. Data stored in the semiconductor memories is managed using a file system that allows data to be recorded or reproduced in files. The file system may be, for example, a file allocation table (FAT) file system. The data management using a file system is a common technique, and will not be described in detail.

The synchronization control section 10 controls cooperative operations performed on the two channels. The synchronization unit 10 includes an association information generation section 101, a synchronous recording control section 100, and an operation input unit 103.

The operation input unit 103 receives an operation from a user. The operation input unit 103 includes, for example, a recording start button and a recording stop button. When receiving a user operation, the operation input unit 103 provides command information based on the input information indicating the user operation to the synchronous recording control section 100.

The synchronous recording control section 100 controls the recording operation performed by each of the recording units 132 and 142 in a manner that the two channels operate in an cooperative manner based on the command information provided from the operation input unit 103. The synchronous recording control section 100 includes an association control section 102 and a recording control section 104.

The association information generation section 101 generates association information for associating a plurality of channels of video data that correspond to each other (for example, video data obtained by the camera unit 130 and video data obtained by the camera unit 140) in response to a request to generate association information that is provided from the synchronous recording control section 100. The association information generation section 101 provides the generated association information to the association control section 102 included in the synchronous recording control section 100. As shown in FIG. 1, the association information generation section 101 includes an ID information generation section 110 and a file name generation section 111. The ID information generation section 110 generates a material ID (ID information or an identifier), which is an example of the association information. The ID information generation section 110 generates material IDs based on predetermined rules in a manner that a common material ID is generated for a plurality of materials that correspond to each other (for example, the recording media 133 and 143). The plurality of materials that correspond to each other are specified using the generated material ID. The file name generation section 111 generates a file name, which is another example of the association information. The file name generation section 111 generates file names based on predetermined rules in a manner that a common file name is generated for a plurality of materials that correspond to each other (for example, the recording media 133 and 143). The plurality of materials that correspond to each other are specified using the generated file name. The processing for generating the association information performed by the association information generation section 101 will be described in detail later.

The association control section 102 transmits a request to generate association information to the association information generation section 101 when receiving a recording start command from the recording control section 104. The association control section 102 controls the recording units 132 and 142 to record association information (for example, material IDs or file names) obtained from the association information generation section 101. More specifically, as shown in FIG. 1, the association control section 102 includes an ID information addition control section 120 and a file name control section 121. The ID information addition control section 120 provides control information (for example, a command and a material ID generated by the ID information generation section 110) to the recording units 132 and 142. The ID information addition control section 120 then controls the recording units 132 and 142 to record the received material ID. The file name control section 121 provides control information (for example, a command and a file name generated by the file name generation section 111) to each of the recording units 132 and 142. The file name control section 121 controls each of the recording units 132 and 142 to generate a file having the received file name.

The recording control section 104 receives command information provided from the operation input unit 103. The recording control section 104 controls the recording operation performed by the association control section 102 and the recording units 132 and 142. In the present embodiment, two pieces of video data obtained at the same timing by the two camera units 130 and 140 are processed separately through the video processing units 131 and 141 and provided separately to the recording units 132 and 142. This recording operation (more precisely a part of the recording operation) is achieved through various processes performed by the camera units 130 and 140 and the video processing units 131 and 141 in synchronization with video frames. The recording control section 104 is only required to control the recording units 132 and 142 to start recording at the same timing and to stop recording at the same timing. Such synchronization control is a commonly known technique, and will not be described in detail.

As described above, the recording unit 132 records video data onto the recording medium 133 and the recording unit 142 records video data onto the recording medium 143 in accordance with the control information provided from the recording control section 104 and the association control section 102. More specifically, each of the recording units 132 and 142 records the received material ID based on the control information (the command and the material ID) provided from the ID information addition control section 120. Each of the recording units 132 and 142 then generates a file having the received file name based on the control information (the command and the file name) provided from the file name control section 121.

Although FIG. 1 shows the structure for recording only video data, audio data (not shown) may be recorded together with the video data when required. The same applies to the structure or processing described hereafter. Such recording is a commonly used technique, and will not be described in detail.

2. Explanation of Terms

The terms used in the present embodiment will now be explained. The three-dimensional shooting refers to recording of stereoscopic three-dimensional video data (namely, two channels of video data obtained using the two camera units 130 and 140 that have a disparity between them), and also audio data when required, using the video recording apparatus 1 shown in FIG. 1. The stereoscopic three-dimensional video data is video data obtained through two channels that have a parallax between them, and includes video data to be perceived by a left eye and video data to be perceived by a right eye. Information identifying each of the left-eye video data and the right-eye video data obtained through the two channels corresponds to a channel. For convenience, the video data to be perceived by the left eye is referred to as L channel video data, and the video data to be perceived by the right eye is referred to as R channel video data. The video recording apparatus 1 shown in FIG. 1 performs two-channel recording, and records the L channel video data onto the recording medium 133 and the R channel video data onto the recording medium 143. The stereoscopic three-dimensional video is referred to as a 3D video. The three-dimensional shooting is referred to as 3D shooting.

A specific example of the format applicable to the present embodiment is AVCHD format. The structure of data recorded in AVCHD format may include three layers: a layer in which index tables for managing media and movie objects (MovieObject) are arranged; a layer in which playlists (PlayList) for designating a part of an AV stream to be reproduced and playitems (Playitem) are arranged; and a layer in which AV streams are arranged. This hierarchical data structure will be described in detail later.

In the present embodiment, a 3D shot (3D Shot) is a single continuous recording section defined by the start and the stop of a single recording operation of video data performed by the video recording apparatus 1. The 3D shot includes of 3D clips (3D Clip) belonging to the single continuous recording section. Each 3D clip is an element of the 3D shot. The 3D clips include clips obtained through two channels, namely, a clip obtained through L channel (L channel clip) and a clip obtained through R channel (R channel clip). Each clip contains AV stream data (main video data, and also audio data when required) and management information. For example, a single 3D shot can be formed by a single 3D clip or can be formed by a plurality of 3D clips depending on the limitations on the file size. A shot (Shot) is formed by clips obtained through the same channel (formed for example by only L channel clips) among a plurality of 3D clips included in a single 3D shot.

The AV stream data is data obtained by sampling, on the time axis, video data, and also audio data when required. The video data may have been subjected to compression coding as necessary. The clip AV stream is AV stream data included in a clip. The clip AV stream file is a file containing video data, and also audio data when required. In AVCHD format, for example, video data, and also audio data when required, are packetized with the MPEG2 transport stream (TS) and multiplexed to generate a single clip AV stream file to be recorded.

Figure 2:
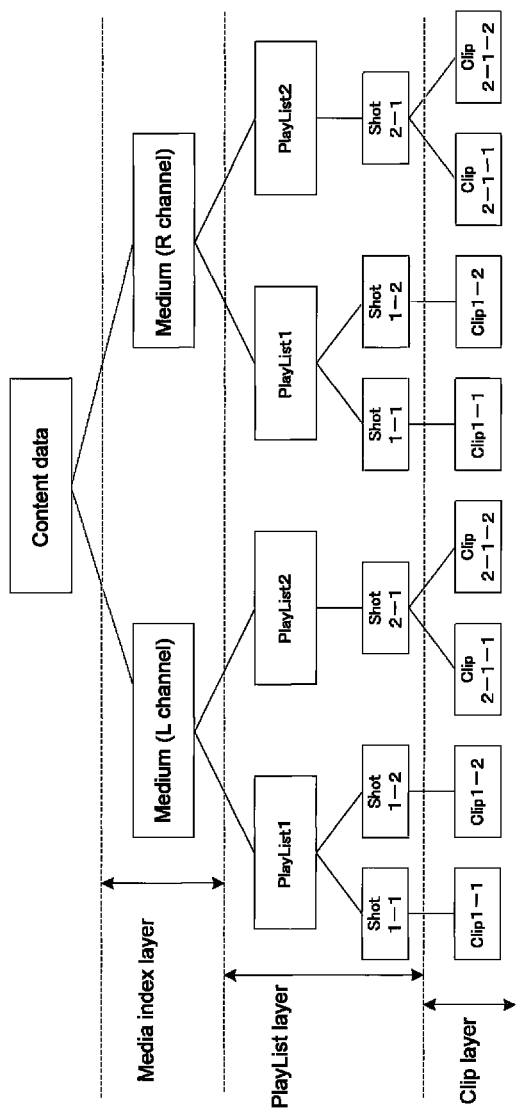
FIG. 2 is a conceptual diagram showing the structure of content data used in the first embodiment.

FIG. 2 shows the structure of content data used in the present embodiment. For example, Shot2-1 arranged under the L channel medium and Shot2-1 arranged under the R channel medium correspond to each other. For L channel, Clip2-1-1 and Clip2-1-2 are arranged under Shot2-1. For R channel, Clip2-1-1 and Clip2-1-2 are arranged under Shot2-1. The playlists (PlayList) shown in FIG. 2 are in AVCHD format. Each shot is a section defined by a mark at a reproducing start point and a mark following the reproducing start mark in a playlist in AVCHD format. The reproducing start mark indicates the start of the shot.

Figure 3:
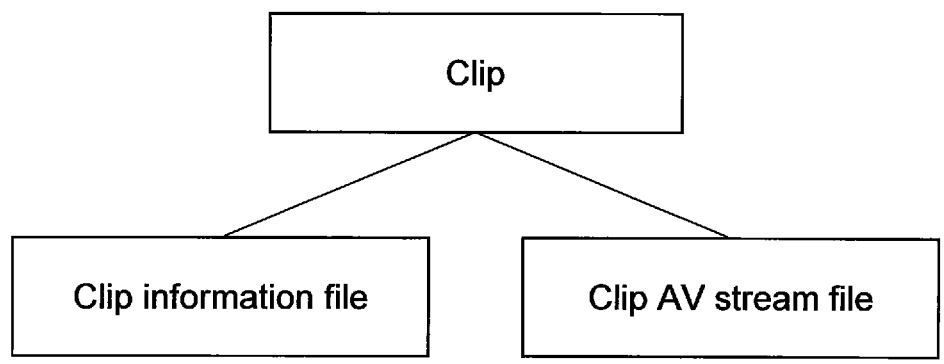
FIG. 3 is a conceptual diagram showing the structure of a clip used in the first embodiment.

FIG. 3 shows the structure of a clip. The clip includes a clip AV stream file, which contains AV stream data, and a clip information file, which contains management information.

A material ID generated by the ID information generation section 110 in the present embodiment is used to associate a plurality of materials that correspond to each other. The same material ID is added to a plurality of pieces of data for a plurality of materials (a plurality of pieces of material data) that correspond to each other. A Group including a plurality of pieces of material data that correspond to each other is one example of a "data set". In 3D shooting, for example, the same material ID is added to a plurality of pieces of data for two materials belonging to L channel and R channel that are recorded simultaneously. When video data is reproduced, the material IDs added to the plurality of materials (or the plurality of pieces of material data) are used to determine whether the materials correspond to each other. When the material IDs added to the plurality of materials are identical, the materials are determined to correspond to each other. In the present embodiment, material IDs are added to materials (or pieces of material data) in each of the plurality of recording layer independently. The concepts of the recording layers and the concepts of the materials will be described later.

Figure 4:
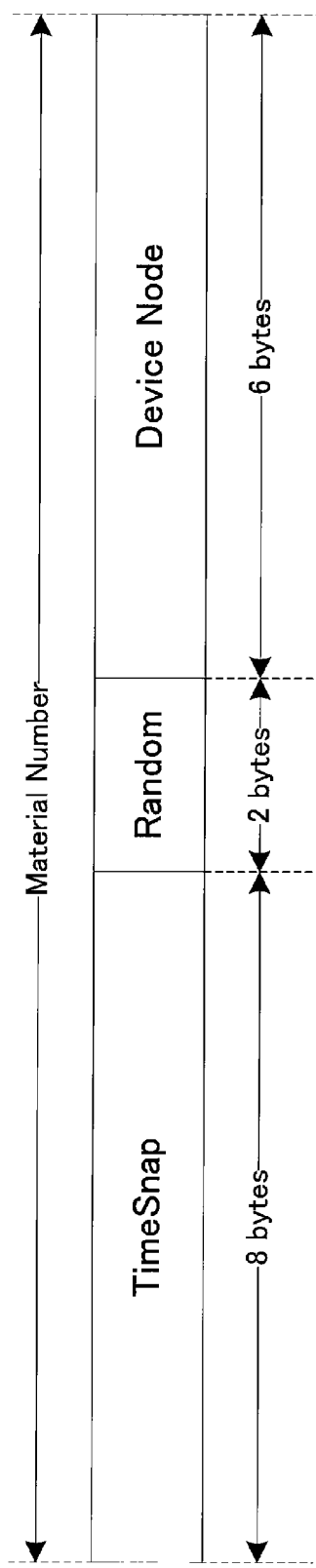
FIG. 4 shows the format of a material ID used in the first embodiment.

In the present embodiment, the values of the material IDs are generated using extended SMPTE-330M (SMPTE: Society of Motion Picture and Television Engineers) Unique Material Identifier (UMID). FIG. 4 shows a material ID generated using the SMPTE method. The material ID includes an identifier specific to a device (Device Node), date and time information (TimeSnap), and a random value (Random). In the present embodiment, the device-specific identifier (Device Node) is a single number given to the ID information generation section 110, and is a predetermined identifier unique to the device. The identifier Device Node may be, for example, a serial number of the device (the synchronization control section 10). The serial number is stored in advance in, for example, a nonvolatile memory included in the video recording apparatus 1. When recording is started, material IDs are generated by referring to the serial number. The date and time information (TimeSnap) is generated using information about the date and time at which recording is started using, for example, a real time clock (RTC) included in the video recording apparatus 1.

3. Relevant Information 3.1 Hierarchical Structure of Data to be Recorded

Figure 5:
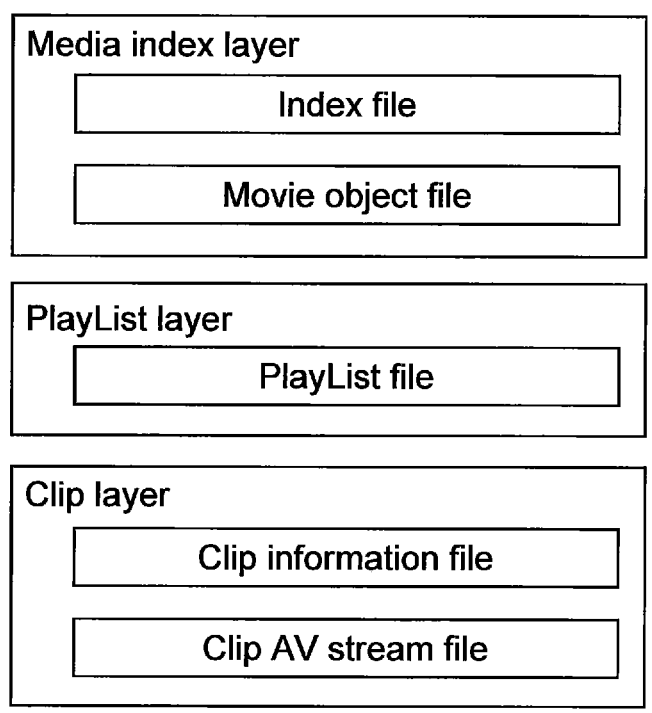
FIG. 5 is a conceptual diagram showing the hierarchical structure of data to be recorded in the first embodiment.

FIG. 5 schematically shows the structure of data to be recorded onto the recording media 133 and 143 defined by AVCHD format, which is an example of the format applicable to the present embodiment. Data recorded in AVCHD format may include, for example, three recording layers: a layer in which index tables for managing media and movie objects (MovieObject) are arranged; a layer in which playlists (PlayList) for designating a part of an AV stream to be reproduced and playitems (Playitem) are arranged; and a layer in which AV streams are arranged. Index tables are recorded on the recording media 133 and 143 as index files. Movie objects are recorded on the recording media 133 and 143 as movie object files. Playlists (PlayList) and playitems (Playitem) are recorded on the recording media 133 and 143 as PlayList files. AV streams are recorded on the recording media 133 and 143 as clip AV stream files. Management information for AV streams is recorded on the recording media 133 and 143 as clip information files.

FIG. 5 shows the three-layer structure of data that is recorded onto the recording media 133 and 143. Alternatively, for example, the data to be recorded onto the recording media 133 and 143 may have a four-layer structure in which index files and movie object files, which are arranged in the media index layer of the three-layer structure, are arranged separately in different layers.

The media index layer is used to manage information for the corresponding medium. The PlayList layer is used to manage playlists for designating, for example, the order in which an AV stream is reproduced or a part of an AV stream to be reproduced, and management information and meta data for shots (additional information for the AV stream data to be recorded). The Clip layer is used to manage clips including AV stream data and management information for the AV stream data.

These recording layers correspond to the layers of the content data shown in FIG. 2. More specifically, the media index layer corresponds to the L channel medium and the R channel medium. The Playlist layer corresponds to PlayList1, Playlist2, Shot1-1, Shot1-2, and Shot2-1. The Clip layer corresponds to Clip1-1, Clip1-2, Clip2-1-1, and Clip2-1-2. The materials for 3D video data obtained through 3D shooting are called 3D materials. The concepts of the materials are as follows. The materials correspond to each other while belonging to the same layer but belonging to different channels, namely, L channel and R channel. In the media index layer, for example, the recording media are treated as the materials. In the PlayList layer, the playlists (PlayList) are treated as the materials and the shots (Shot) are treated as the materials. In the Clip layer, the clips (Clip) are treated as the materials.

Figure 6:
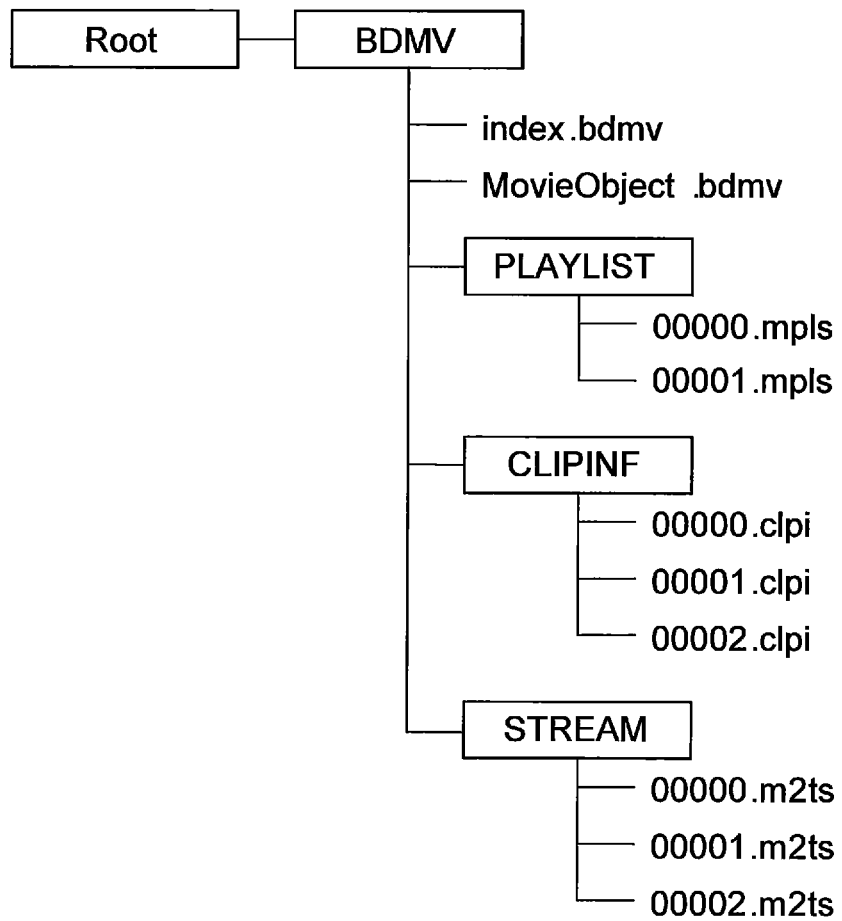
FIG. 6 shows the directory structure of data to be recorded in the first embodiment.

FIG. 6 shows the directory structure of each of the recording media 133 and 143 in the present embodiment. The index file has a file name "index.bdmv". The movie object file has a file name "MovieObject.bdmv". Under the PLAYLIST directory, PlayList files are arranged. Under the CLIPINF directory, clip (Clip) information files are arranged. Under the STREAM directory, clip AV stream files are arranged.

3.2 Association in the Hierarchical Structure

Figure 7:
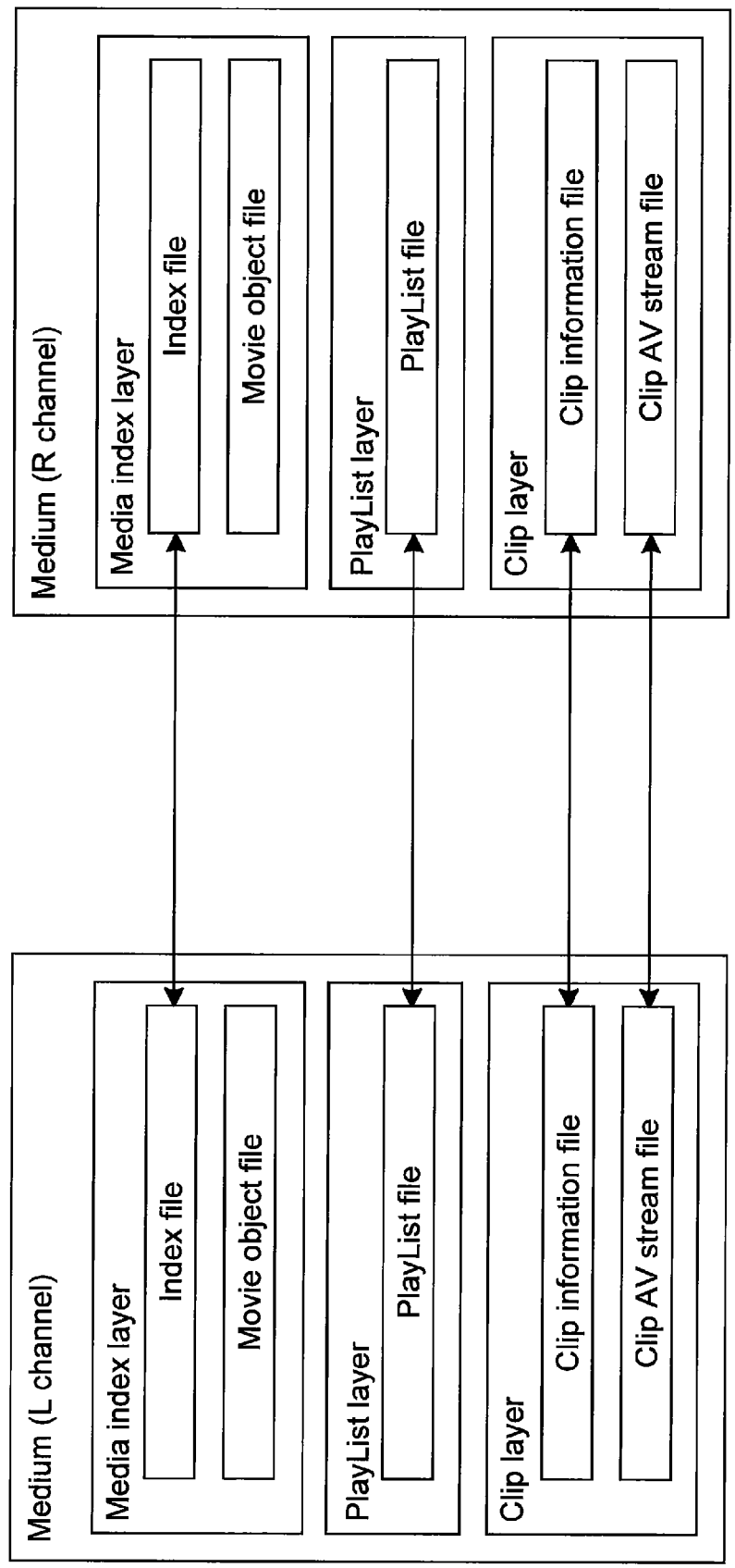
FIG. 7 is a conceptual diagram showing the association between the hierarchical structures of data to be recorded in the first embodiment.

FIG. 7 is a conceptual diagram showing the association between the hierarchical structure of data to be recorded onto the recording medium 133 and the hierarchical structure of data to be recorded onto the recording medium 134. In the present embodiment, the association is performed in each of the plurality of recording layers independently. The association performed in each recording layer specifically means the association performed between elements (materials) included in the same recording layer as shown in FIG. 7. In the present embodiment, the association is performed in each of the media index layer, the PlayList layer, and the Clip layer independently. In the media index layer, a plurality of recording media are associated with each other. In the examples shown in FIGS. 2 and 7, the L channel medium and the R channel medium are associated with each other. In the PlayList layer, playlists (PlayList) are associated with each other, and shots (Shot) are associated with each other. In the Clip layer, clips (Clip) are associated with each other. The content data used in the present embodiment has the structure shown in FIG. 2, in which all the elements included in each of the recording layers are associated with each other. For example, each of the recording media 133 and 143 stores a plurality of shots, each of which is associated with another shot. In FIG. 7, the L channel medium corresponds to the recording medium 133 in FIG. 1, and the R channel medium corresponds to the recording medium 143.

The materials that have been associated with each other in each of the recording layers with the above-described method can be specified in each of the plurality of recording layers independently. An apparatus or software that has the reproducing function and/or the video editing function may interpret (or reproduce) data stored in any recording layer selected depending typically on the specifications of the apparatus or the software. When materials are associated with each other in each recording layer independently, the apparatus or the software can specify materials that are associated with each other when interpreting any recording layer. In the present embodiment, materials are associated with each other for the recording media 133 and 143 in each recording layer independently. As a result, even an apparatus or software that cannot interpret one or more of the recording layers can specify materials that are associated with each other.

In another embodiment, the association may not be performed in each of all the recording layers independently, but the association may be performed in each of at least two of the recording layers independently. When the association is performed in each of at least two of the recording layers independently, the apparatus or the software having the reproducing function and/or the video editing function can easily specify materials that are associated with each other.

3.3 Method for Associating Materials

In the present embodiment, a plurality of materials (for example, 3D materials) are associated with each other using two association methods (first and second association methods). With the first association method, a plurality of materials are associated with each other using the same identifier. With the second association method, a plurality of materials are associated with each other using file names generated based on predetermined rules. In another embodiment, only one of the two association methods may be used. In still another embodiment, a method other than the two association methods described in the present embodiment may be used. A plurality of materials may be associated with each other using any association method that enables the materials to be associated.

3.3.1 First Association Method

Figure 8:
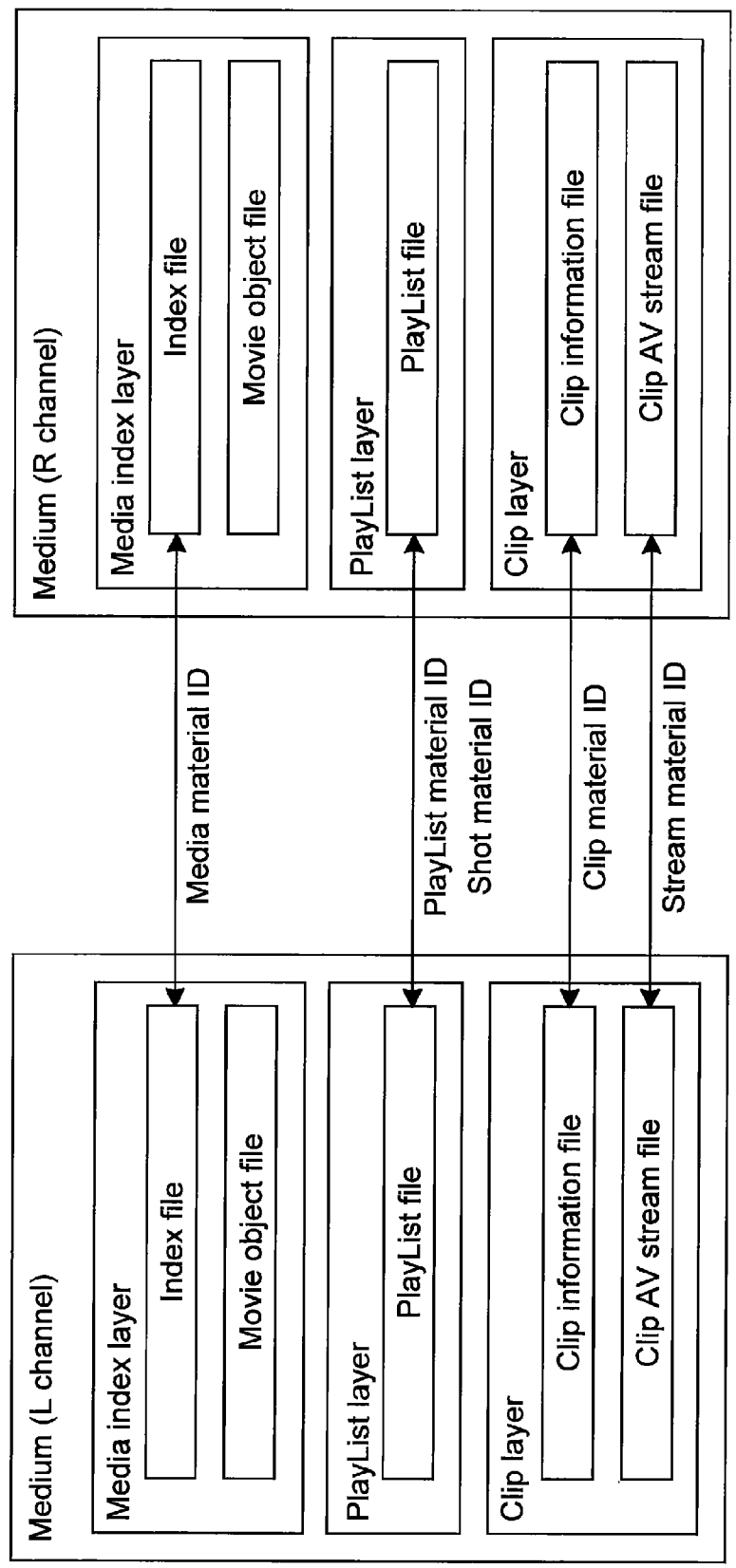
FIG. 8 shows a first association method used in the first embodiment.

FIG. 8 shows the association performed using the first association method. FIG. 8 shows the same as FIG. 7, to which material IDs functioning as association information for each of the recording layers are added. With the first association method, materials in each recording layer are associated with each other using material IDs. The material IDs are identifiers for associating a plurality of materials with each other. Materials (or pieces of material data) that correspond to each other are associated with each other by using material IDs having the same value. The media material IDs are identifiers for associating the recording media that correspond to each other in the media index layer (or in other words for associating index files). The materials to be associated using the media material IDs are recording media (for example, the recording media 133 and 143). The PlayList material IDs are identifiers for associating playlists (PlayList) that correspond to each other in the PlayList layer (in other words for associating PlayList files). The Shot material IDs are identifiers for associating shots (Shot) that correspond to each other in the PlayList layer (in other words for associating marks in PlayList). The Clip material IDs are identifiers for associating clips that correspond to each other in the Clip layer (in other words for associating clip information files). The stream material IDs are identifiers for associating clip AV stream data pieces that correspond to each other in the Clip layer (in other words for associating clip AV stream files).

In the example shown in FIG. 2, the L channel medium and the R channel medium are associated with each other using media material IDs. PlayList1 for the L channel medium and PlayList1 for the R channel medium are associated with each other using PlayList material IDs. Shot1-1 for the L channel medium and Shot1-1 for the R channel medium are associated with each other using PlayList material IDs. Clip1-1 for the L channel medium and Clip1-1 for the R channel medium are associated with each other using clip material IDs and stream material IDs. As shown in FIG. 3, a clip includes a clip information file and a clip AV stream file. A clip information file included in Clip 1-1 for the L channel medium and a clip information file included in Clip1-1 for the R channel medium are associated with each other using clip material IDs. A clip AV stream file included in Clip1-1 for the L channel medium and a clip AV stream file included in Clip1-1 for the R channel medium are associated with each other using stream material IDs.

The recording format of material IDs used by the recording units 132 and 142 will now be described. Each material ID is recorded into a predetermined area included in a data area allocated to material data to which the material ID is added. The predetermined area may be a data area that can be freely extended by a maker for recording information (for example a maker note defined by EXIF (Exchangeable image file format) or may be an area formed at the start of a file to which the material ID is added. Each material ID is recorded, for example, as a number into which binary data or a character string has been converted.

A media material ID is recorded, for example, in an area of an index file defined in advance for recording a media material ID. In the same manner, a PlayList material ID is recorded in, for example, an area of a PlayList file defined in advance for recording a PlayList material ID. A clip material ID is recorded in, for example, an area of a clip information file defined in advance for recording a clip material ID. A stream material ID is recorded in, for example, an area of a clip AV stream file defined in advance for recording a stream material ID. A Shot material ID is added, as additional information added to a shot (Shot), to a mark indicating the start of the shot included in the PlayList file. When video data is reproduced, the Shot material ID can be reproduced (or referred to) as information associated with the shot. More specifically, the Shot material ID is recorded in an area associated with the mark indicating the start of the shot.

Although the present embodiment describes the case in which a file included in each recording layer has a predetermined area for recording a material ID, each material ID may be recorded in any area in any format that enable the file to which the material ID is added to be identified and the recording layer including the file to be identified. For example, each material ID may not be recorded directly in the file to which the material ID is added, but may be recorded in an area different from an area storing the file to which the material ID is added. The material ID is recorded in a different area in a manner that the file to which the material ID is added can be referred to using the material ID recorded in the different area. Alternatively, a single file containing only a material ID may be recorded. For example, a text file associating a material ID with a file to which the material ID is added may be recorded.

3.3.2 Second Association Method

Figure 9:
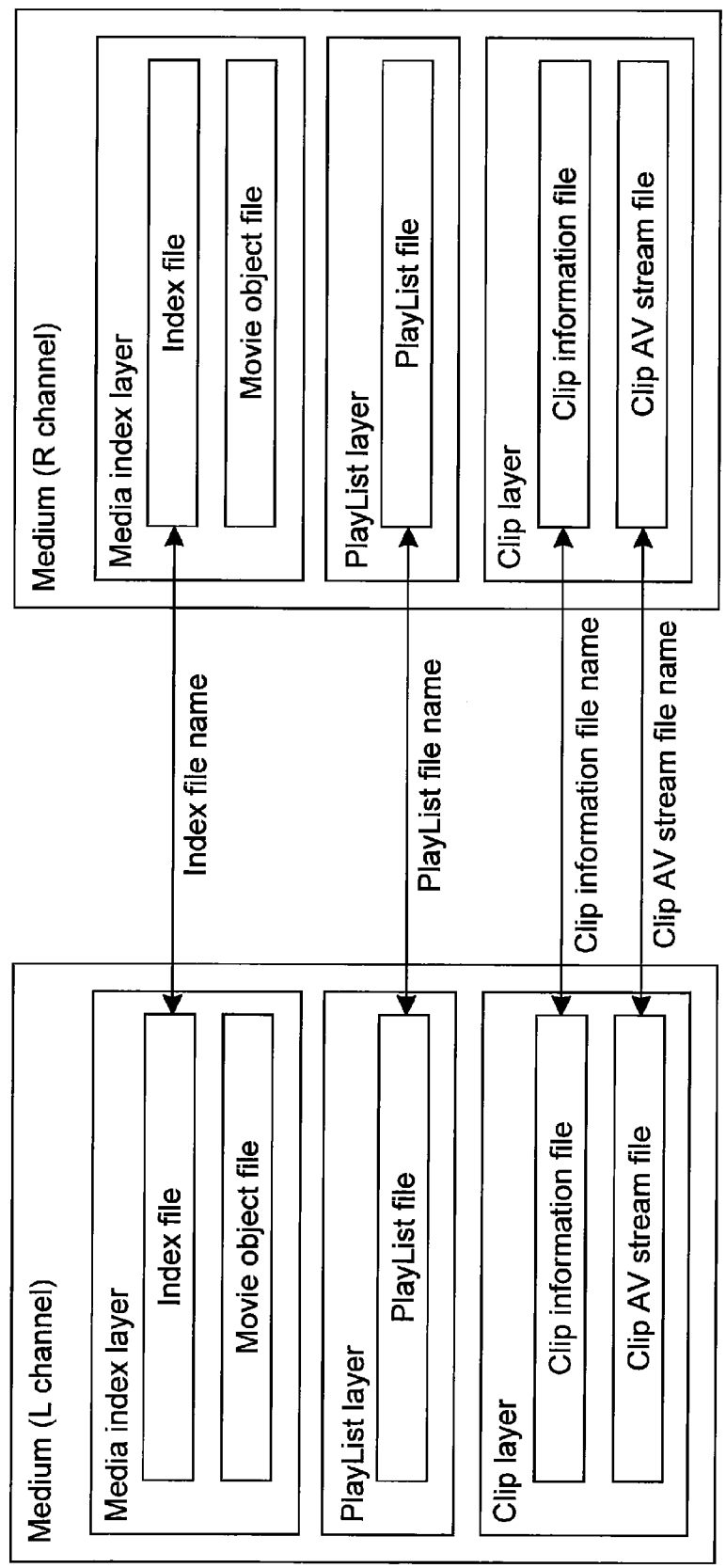
FIG. 9 shows a second association method used in the first embodiment.

FIG. 9 shows the association performed using the second association method. FIG. 9 shows the same as FIG. 7, to which the types of file name functioning as association information for each of the recording layers are added. With the second association method, materials in each recording layer are associated with each other using file names. The file names are generated based on predetermined rules when video data is recorded. When video data is reproduced, the association between L channel files and R channel files is detected based on the file names as well as based on the rules used to generate the file names.

The rules used to generate the file names will now be described. In the present embodiment, each file name is a character string representing a five-digit number to which an extension has been added. In the example shown in FIG. 10, a clip information file has an extension ".clpi". The clip information file has a file name "00000.clpi".

Figure 10:
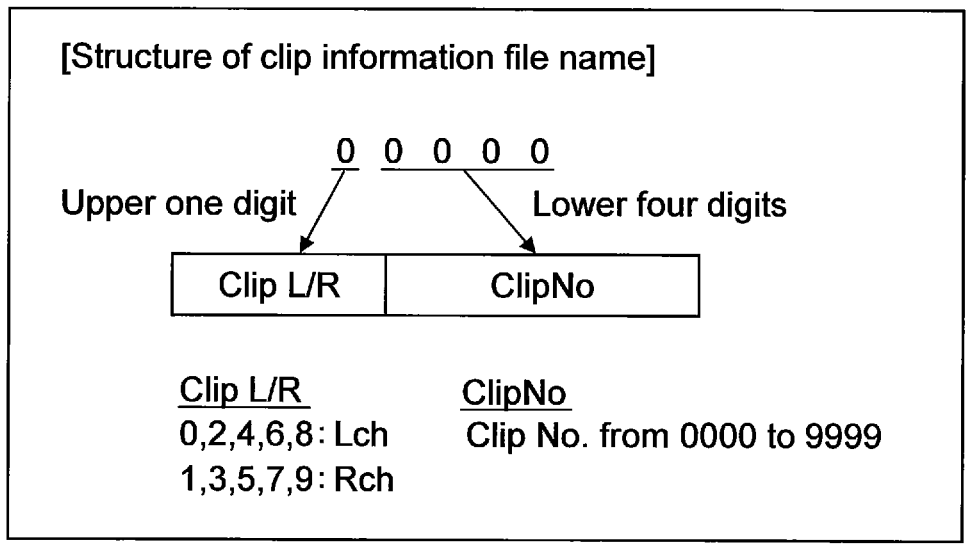
FIG. 10 shows the structure of a file name used in the first embodiment.

FIG. 10 shows the structure of the five-digit number included in the file name of the clip information file. The upper one digit number (ClipL/R) of the file name for the L channel medium is an even number selected from 0, 2, 4, 6, and 8. The upper one digit number (ClipL/R) of the file name for the L channel medium can be selected by the user using, for example, a menu screen. The upper one digit number (ClipL/R) of the file name for the R channel medium is an odd number obtained by adding 1 to the upper one digit number for the L channel medium. The upper one digit (ClipL/R) indicates whether the file belongs to L channel or R channel, and prevents files that belong to different channels and that are associated with each other from having the same file name. The lower four digit number (ClipNo) of the file name is the same for the files that separately belong to the L channel medium and the R channel medium and that are associated with each other. For example, the files that correspond to each other may have file names "00002.clpi" and "10002.clpi".

The five-digit number of the file name of the clip AV stream file is the same as the five-digit number of the file name of the clip information file. The clip AV stream file has an extension ".m2ts". When, for example, the clip information file has a file name "00002.clipi", the clip AV stream file has a file name "00002.m2ts".

The PlayList file has an extension ".mpls". In the present embodiment, the file names of PlayList files that correspond to each other and belong to different channels have the same five-digit number. Unlike the clip AV stream files containing main video data, the PlayList file contains management information for main video data. Unlike the clip AV stream files, the PlayList files do not need to be prevented so carefully from having the same file name.

The index file recorded on the L channel medium and the index file recorded on the R channel medium have the same file name. The same applies to the movie object files. Under AVCHD format, the index file has a file name "index.bdmv", and the movie object has a file name "MovidObject.bdmv".

When video data is reproduced, the association between materials that belong to different channels is detected based on the predetermined rules that have been used to generate these file names.

3.4 Synchronization Frame

Figure 11:
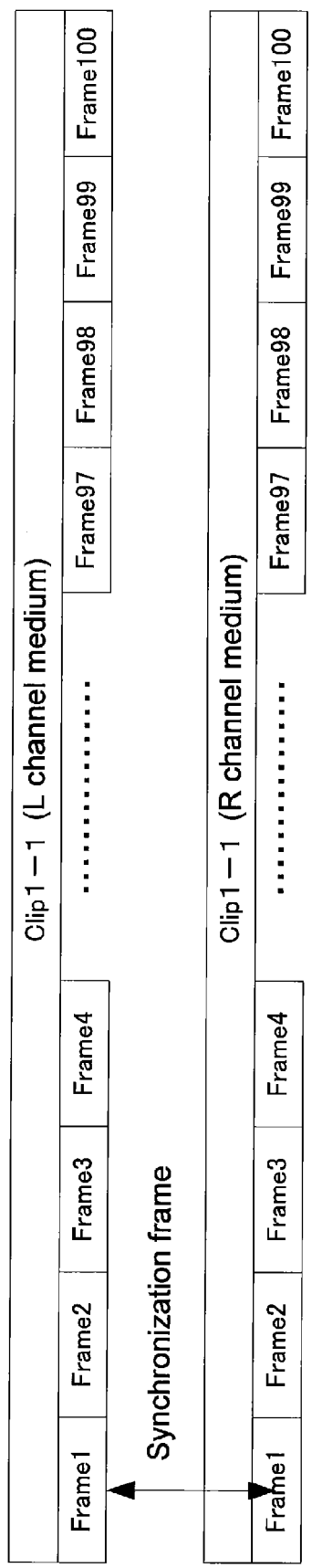
FIG. 11 is a conceptual diagram showing synchronization frames used in the first embodiment.

FIG. 11 is a conceptual diagram showing synchronization frames used in the present embodiment. The synchronization frames are video frames included in the L channel AV stream and the R channel AV stream that correspond to each other (frames corresponding to each other). FIG. 11 shows synchronization frames that are two frames "Frame1" included in two clips "Clip1-1" in the example of the content data shown in FIG. 2. In the present embodiment, the synchronization frames are defined as the first frames included in shots. In this case, a synchronization frame can be specified using a mark indicating the start of a shot (Shot) of a playlist (PlayList). In FIG. 11, marks are added at positions corresponding to the frames "Frame1".

When video data is reproduced, the synchronization frames are output at the same timing to enable a plurality of pieces of video data to be reproduced in synchronization with each other. More specifically, the marks (each added at the start of Shot) corresponding to each other in the playlists (PlayList) for the L channel medium and for the R channel medium are detected. The reproduction is then started from the frames arranged at the positions indicated by the detected marks. The operation for this synchronous reproduction will be described in detail later.

For AV stream data, audio data is output at predetermined timing that is defined with respect to the output timing of video data. Audio data for each frame of video data is reproduced in synchronization with reproduction of each frame of video data. Thus, the correspondence between a plurality of pieces of data is defined only for video data in the present embodiment. In another embodiment, the synchronization frames may not be the first frames of shots. For example, marks different from the marks each indicating the start of a shot may be added to video frames that correspond to each other at freely selected positions. In this case, the marks that correspond to each other may be associated with each other using, for example, the first association method described above.

4. Recording Operation of Video Recording Apparatus

The operation for recording video data performed by the video recording apparatus 1 with the above-described structure will now be described.

4.1 Synchronous Recording Operation

The synchronous recording operation performed by the synchronization control section 10 will now be described in detail. When recording of video data is started, for example, information indicating a user operation of pressing the recording start button is input via the operation input unit 103. Based on the information indicating the user operation of pressing the recording start button, the operation input unit 103 provides a recording start command to the recording control section 104 and the association control section 102 included in the synchronous recording control section 100. The operation input unit 103 provides a recording start command when the recording start button is pressed while recording is not being performed. The operation input unit 103 provides a recording stop command when the recording stop button is pressed during recording. The mode switching performed by the operation input unit 103 is a commonly used technique, and will not be described in detail.

The association control section 102 provides a request to generate association information to the association information generation section 101 based on the recording start command provided from the operation input unit 103. In response to the request to generate association information, the association control section 102 obtains association information for each recording layer. The association control section 102 then provides the association information for each recording layer to the two-channel recording units 132 and 142. In the present embodiment, the association information is provided to the recording units 132 and 142 before the recording start command is transmitted from the recording control section 104 to the recording units 132 and 142. The processing for generating the association information performed by the association information generation section 101 and the control for recording the association information executed by the association control section 102 will be described in detail later.

In response to the recording start command provided from the operation input unit 103, the recording control section 104 determines whether the two-channel recording units 132 and 142 have completed preparations for recording and also whether the recording units 132 and 142 are enabled for data recording (are in recordable state). Subsequently, the recording control section 104 provides the recording start command to the two-system recording units 132 and 142. The determination as to whether the recording units 132 and 142 have completed preparations for recording and whether the recording units 132 and 142 are in recordable state is the processing for determining whether video data recording has been enabled. This processing is specifically performed by determining the recordable capacity (remaining capacity) of the recording media 133 and 143 and determining whether the recording units 132 and 142 operate normally. This is commonly known processing performed by the typical video recording apparatus 1, and will not be described in detail. In the present embodiment, the recording control section 104 provides the recording start command to the recording units 132 and 142 (or suspends the processing when necessary) only after the association control section 102 provides the association information to the recording units 132 and 142. The recording control section 104 waits until then, while preparing for recording have been completed and determining whether the recording units 132 and 142 are in recordable state.

The video recording control executed from when video data is obtained by the camera units 130 and 140, the video processing units 131 and 141, and the recording units 132 and 142 to when the video data is recorded onto the recording media 133 and 143 is a commonly known technique, and will not be described in detail.

4.2 Generation Timing for File to Be Recorded

The timings at which each file is recorded onto the recording media 133 and 143 will now be described. Files belonging to the media index layer (an index file and a movie objet file) are generated when data is initially recorded onto the recording media 133 and 143 after the file system of the recording media 133 and 143 is initialized (formatted). A PlayList file belonging to the PlayList layer is newly generated when recording is to be started and the recording media 133 and 143 store no PlayList file or no data can be written to the existing PlayList file due to the specifications (for example, due to the limitations on the file size). A clip information file is generated when a clip is additionally recorded onto the recording media 133 and 143 (when recording of a new shot is started, or when a shot needs to be divided into a plurality of clips due to the size limitations). A clip AV stream file is generated when a clip is additionally recorded onto the recording media 133 and 143. The clip AV stream file is generated at the same timing as when the clip information file is generated. A shot is recorded as a mark in a PlayList file instead of being recorded as a file. The shot is generated when a mark indicating the start of a shot is additionally recorded into the PlayList file. Each of these different types of files is generated as a pair of files. The two files forming each pair are generated respectively by the recording units 132 and 142. The recording control section 104 provides the recording start command simultaneously to the two recording units 132 and 142 to control the two files forming the pair to be recorded simultaneously onto the two recording media (the recording media 133 and 143).

The timings at which each file is generated in the recording operation will now be described. In response to the recording start command provided from the recording control section 104, the recording units 132 and 142 start the recording operation. Each of the recording units 132 and 142 generates an index file and a movie object file when video data is to be recorded initially onto the recording media 133 and 143 after the file system is initialized. At the same time, each of the recording units 132 and 142 generates a PlayList file as necessary. When recording of a clip is started, each of the recording units 132 and 142 generates a clip information file and a clip AV stream file. When recording of a shot is started, each of the recording units 132 and 142 adds a mark indicating the start of a shot at a predetermined position of the PlayList file. Although the present embodiment describes the case in which each file is generated when the video data recording is started, each file may be generated when the video data recording is stopped. When each file is generated at the stop of the video data recording, data to be recorded into each file may be stored temporarily in for example a buffer memory during recording of the video data. The data stored temporarily may later be recorded onto the recording media 133 and 143 in the form of appropriate files generated at the stop of the video data recording. It is preferable that the data stored temporarily be released after the data is recorded onto the recording media.

4.3 Generation of Association Information

The processing for generating association information performed by the association information generation section 101 will now be described in detail. The association information generation section 101 includes the ID information generation section 110, which generates association information (material ID) used with the first association method, and the file name generation section 111, which generates association information (file name) used with the second association method. In the present embodiment, a plurality of materials are associated with each other using the two association methods. To enable this, the association control section 102 provides a request to generate association information to both the ID information generation section 110 and the file name generation section 111.

4.3.1 Generation of Material ID

The ID information generation section 110 generates material IDs including a media material ID, a PlayList material ID, a Shot material ID, a clip material ID, and a stream material ID. In the present embodiment, each material ID has, for example, the format shown in FIG. 4. In this format, Device Node is an identifier unique to the device, and has the same value even after the apparatus repeatedly performs the recording operation. TimeSnap and Random are the material IDs with different values generated by the same apparatus. TimeSnap indicates the date and time information. Random has a random value generated with a typical method for generating a random value. The use of Random enhances the uniqueness of the material ID. However, Device Node and TimeSnap can also enhance the uniqueness of the material IDs. Thus, Random may not necessarily have a random value, but may have a fixed value, or Random may be eliminated.

In the present embodiment, a plurality of pieces of material data are recorded separately onto the two recording media 133 and 143. Two pieces of material data that correspond to each other are given the same material ID. Each material ID generated by the ID information generation section 110 is provided to each of the two recording units (recording units 132 and 143) via the synchronous recording control section 100.

A media material ID is generated when an index file is recorded onto each of the recording media 133 and 143. Timing M1 is assumed to be the timing at which the index file is to be recorded. When the TimeSnap value at timing M1 is TS_M1, the TimeSnap value of the media material ID added to the index file recorded at timing M1 is TS_M1. The media material ID value generated based on TS_M1 is assumed to be ID_M1. In the present embodiment, the recording media 133 and 143 are formatted before recording is performed. When data is initially recorded onto the recording media 133 and 143 after the recording media are formatted, the directory structure is generated for each of the recording media (the recording media 133 and 143), and the media material IDs are recorded onto each of the recording media. In another embodiment, the directory structure may be generated and the media material IDs may be recorded immediately after the recording media are formatted. It is required that materials be associated with each other for the L channel and the R channel. In the present embodiment, the media materials that are recorded separately onto the two recording media 133 and 143 and that correspond to each other have media material IDs having the same value (ID_M1 for example). This is achieved by providing a single media material ID generated by the ID information generation section 110 to the two recording units (recording units 132 and 143) via the synchronous recording control section 100. In the example shown in FIG. 2, ID_M1 is added to the L channel medium and to the R channel medium.

A PlayList material ID is generated when the PlayList file is recorded onto each of the recording media 133 and 143. Timing P1 is assumed to be the timing at which the first PlayList file is recorded. Timing P2 is assumed to be the timing at which the second PlayList file is recorded. When the TimeSnap value at timing P1 is TS_P1 and the TimeSnap value at timing P2 is TS_P2, the TimeSnap value for the PlayList material ID added to the PlayList file to be recorded at timing P1 is TS_P1, and the TimeSnap value for the PlayList material ID added to the PlayList file to be recorded at timing P2 is TS_P2. Further, the media material ID values that are generated based on TS_P1 and TS_P2 are ID_P1 and ID_P2. In the present embodiment, a new PlayList file is generated when the recording media 133 and 143 store no PlayList file or when no data can be written to the existing PlayList file due to the limitations on the file size. In another embodiment, the PlayList material IDs may be recorded at any timing as long as the recorded PlayList material IDs enable association between L channel and R channel. In another embodiment, the PlayList files that correspond to each other are given PlayList material IDs having the same value (ID_P1 for example). This is achieved by providing a single PlayList material ID generated by the ID information generation section 110 to the two recording units (the recording units 132 and 143) via the synchronous recording control section 100. In the example shown in FIG. 2, ID_P1 is added to PlayList1 for the L channel medium and to PlayList1 for the R channel medium. ID_P2 is added to PlayList2 for the L channel medium and to PlayList2 for the R channel medium.

A Shot material ID is generated when a shot (Shot) is additionally recorded onto the recording media 133 and 143 (that is, when a mark indicating the start of a shot is recorded). The first shot is assumed to be recorded at timing S1, the second shot at timing S2, and the third shot at timing S3. The TimeSnap values corresponding to timings S1, S2, and S3 are assumed to be TS_S1, TS_S2, and TS_S3, respectively. In this case, the TimeSnap values included in the Shot material IDs added to the first, second, and third shots recorded at timings S1, S2, and S3 are TS_S1, TS_S2, and TS_S3, respectively. Further, the Shot material ID values generated based on TS_S1, TS_S2, and TS_S3 are assumed to be ID_S1, ID_S2, and ID_S3, respectively. Timings S1, S2, and S3 may be any timings within a period from when recording of the corresponding shots is started to when recording of the shots is stopped, but are only required to be uniquely set in the video recording apparatus 1. In the present embodiment, timings S1, S2, and S3 are set as the timings at which recording of the corresponding shots is started. The shots that correspond to each other are given the Shot material IDs having the same value (ID_S1 for example). This is achieved by providing a single Shot material ID generated by the ID information generation section 110 to the two recording units (the recording units 132 and 143) via the synchronous recording control section 100. In the example shown in FIG. 2, ID_S1 is added to Shot1-1 for the L channel medium and to Shot1-2 for the R channel medium. ID_S2 is added to Shot1-2 for the L channel medium and to Shot1-2 for the R channel medium. ID_S3 is added to Shot2-1 for the L channel medium and to Shot2-1 for the R channel medium.

A clip material ID is generated when a clip is additionally recorded onto the recording media 133 and 143 (that is, when a clip information file is additionally recorded). The first clip is assumed to be recorded at timing C1, the second clip at timing C2, the third clip at timing C3, and the fourth clip at timing C4. The TimeSnap values corresponding to timings C1, C2, C3, and C4 are assumed to be TS_C1, TS_C2, TS_C3, and TS_C4, respectively. In this case, the TimeSnap values included in the clip material IDs that are added to the clips recorded at timings C1, C2, C3, and C4 are TS_C1, TS_C2, TS_C3, and TS_C4, respectively. Further, the clip material ID values generated based on TS_C1, TS_C2, TS_C3, and TS_C4 are assumed to be ID_C1, ID_C2, ID_C3, and ID_C4, respectively. Timings C1, C2, C3, and C4 may be any timings within a period from when recording of the corresponding clips is started to when recording of the clips is stopped, but are only required to be uniquely set in the video recording apparatus 1. In the present embodiment, timings C1, C2, C3, and C4 are set as the timings at which recording of the corresponding clips is started. The clip information files that correspond to each other are given the clip material IDs having the same value (ID_C1 for example). This is achieved by providing a single clip material ID generated by the ID information generation section 110 to the two recording units (the recording units 132 and 143) via the synchronous recording control section 100. In the example shown in FIG. 2, ID_C1 is added to two clip information files corresponding to Clip1-1 for the L channel medium and Clip1-1 for the R channel medium. ID_C2 is added to two clip information files corresponding to Clip1-2 for the L channel medium and Clip1-2 for the R channel medium. ID_C3 is added to two clip information files corresponding to Clip2-1 for the L channel medium and Clip2-1 for the R channel medium. ID_C4 is added to two clip information files corresponding to Clip2-1-2 for the L channel medium and Clip2-1-2 for the R channel medium.

In the present embodiment, the recording timings of the shots and the recording timings of the first clips included in the shots can be identical to each other. In other words, timings S1 and C1 can be identical, timings S2 and C2 can be identical, and timings S3 and C3 can be identical. In this case, for example, ID_S1 and ID_C1 can be identical to each other. However, the Shot material ID and the clip material ID are identifiers for identifying different types of materials. No determination would thus be performed as to whether a Shot material and a Clip material are associated with each other by referring to the Shot material ID and the clip material ID (described in detail later). Thus, the Shot material ID and the clip material ID that can be identical to each other would not cause any problems, and allow both the association process during recording and the association search process during reproduction to be performed correctly. To prevent the Shot material ID and the clip material ID from being identical to each other, timing S1 and timing C1 may be set different. Alternatively, the settings may be controlled to prevent only the TimeSnap values and/or the Random values included in the Shot material ID and the clip material ID from being identical.

A stream material ID is generated when a clip is additionally recorded onto the recording media 133 and 143 (that is, when a clip AV stream file is additionally recorded). The first clip is assumed to be recorded at timing A1, the second clip at timing A2, the third clip at timing A3, and the fourth clip at timing A4. The TimeSnap values corresponding to timings A1, A2, A3, and A4 are assumed to be TS_A1, TS_A2, TS_A3, and TS_A4, respectively. In this case, the TimeSnap values included in the stream material IDs that are recorded at timings A1, A2, A3, and A4 are TS_A1, TS_A2, TS_A3, and TS_A4, respectively. Further, the stream material ID values generated based on TS_A1, TS_A2, TS_A3, and TS_A4 are assumed to be ID_A1, ID_A2, ID_A3, and ID_A4, respectively. Timings A1, A2, A3, and A4 may be any timings within a period from when recording of the corresponding clips is started to when recording of the clips is stopped, but are only required to be uniquely set in the video recording apparatus 1. In the present embodiment, timings A1, A2, A3, and A4 are set as the timings at which recording of the corresponding clips is started. The clip AV stream files that correspond to each other are given the stream material IDs having the same value (ID_A1 for example). This is achieved by providing a single stream material ID generated by the ID information generation section 110 to the two recording units (the recording units 132 and 143) via the synchronous recording control section 100. In the example shown in FIG. 2, ID_A1 is added to two clip AV stream files corresponding to Clip1-1 for the L channel medium and Clip1-1 for the R channel medium. ID_A2 is added to two clip AV stream files corresponding to Clip1-2 for the L channel medium and Clip1-2 for the R channel medium. ID_A3 is added to two clip AV stream files corresponding to Clip2-1-1 for the L channel medium and Clip2-1-1 for the R channel medium. ID_A4 is added to two clip AV stream files corresponding to Clip2-1-2 for the L channel medium and Clip2-1-2 for the R channel medium.

In the present embodiment, the recording timings of the clip information files and the recording timings of the clip AV stream files can be identical to each other. In other words, timings C1 and A1 can be identical, timings C2 and A2 can be identical, timings C3 and A3 can be identical, and timings C4 and A4 can be identical. In this case, for example, ID_C1 and ID_A1 can be identical to each other. However, the clip material ID and the stream material ID are identifiers for identifying different types of materials. No determination would thus be performed as to whether a Clip material and a stream material are associated with each other by referring to the clip material ID and the stream material ID (described in detail later). Thus, the clip material ID and the stream material ID that can be identical to each other would not cause any problems, and allow both the association process during recording and the association search process during reproduction to be performed correctly. To prevent the clip material ID and the stream material ID from being identical to each other, timing C1 and timing A1 may be set different. Alternatively, the settings may be controlled to prevent only the TimeSnap values and/or the Random values included in the clip material ID and the stream material ID from being identical.

The TimeSnap value may be determined with any method with which the value can be set uniquely in the video recording apparatus 1. For example, the TimeSnap value may be generated by incrementing the value every time when the video data recording operation is started.

4.3.2 Generation of File Name

The file name generation section 111 generates file names of the files described above in each of the plurality of recording layers. The file name generation section 111 generates the file name of each file based on the specific rules described above with the second association method. The fixed character string part of each file name and the extension of the file are prestored in, for example, a nonvolatile memory (not shown) included in the video recording apparatus 1. The file name generation section 111 generates a file name by generating a five-digit number based on the above rules and combining the generated number with the extension. This file name generation is a commonly known technique, and will not be described in detail.

4.4. Association Information Control

The association control executed by the association control section 102 will now be described in detail.

4.4.1 Control for Adding Material ID

The ID information addition control section 120 executes control for adding a material ID generated by the ID information generation section 110 to a material (or material data). More specifically, the ID information addition control section 120 provides material IDs to the recording units 132 and 142. The recording units 132 and 142 add a material ID to each material (or material data) based on the received material IDs, and record the material IDs onto the recording media 133 and 143.

The operation for recording material IDs onto the recording units 132 and 142 will now be described. A media material ID is added to an index file when a file belonging to the media index layer (an index file or a movie object file) is generated, and is recorded onto the recording media 133 and 143. In the same manner, a PlayList material ID is added to a PlayList file when the PlayList file is generated, and is recorded onto the recording media 133 and 143. A Shot material ID is recorded onto the recording media 133 and 143 as additional information for a shot (Shot) (in other words, addition information for a mark) when the shot is additionally written into a PlayList file. A clip material ID is added to a clip information file when the clip information file is generated, and is recorded onto the recording media 133 and 143. A stream material ID is added to a clip AV stream file when the clip AV stream file is generated, and is recorded onto the recording media 133 and 143.

4.4.2 Control for Adding File Name

The file name control section 121 executes control for adding a file name generated by the file name generation section 111 to each material (or material data). More specifically, the file name control section 121 provides a file name to each of the recording units 132 and 142. Each of the recording units 132 and 142 generates a file having the received file name, and records the generated file onto the corresponding one of the recording media 133 and 143. While each of the recording units 132 and 142 generates a file with the operation described above, each of the recording units 132 and 142 sets the file name of a file (the file name of, for example, an index file, a movie object file, a PlayList file, a clip information file, or a clip AV stream file) as the file name provided from the file name control section 121.

Although the present embodiment describes the case in which two files forming a pair in each recording layer are recorded separately onto the two recoding media 133 and 143, the two files may be recorded onto a single recording medium. In this case, for example, the files belonging to different channels are required to be recorded separately, or for example recorded into different directories defined in the single recording medium.

Alternatively, video data (AV stream data) obtained through the same channel may be recorded separately onto a plurality of recording media. In this case, the video recording apparatus is required to include a plurality of recording units corresponding in one-to-one to the plurality of recording media, and the recording units are controlled by the synchronization control section 10. These recording units are only required to perform the same processing as the processing performed by the recording units 132 and 142 described in the present embodiment.

Although the present embodiment describes the case in which the video recording apparatus 1 performs 3D stereo shooting, the present invention is also applicable to multipoint shooting using more than two cameras. When the present invention is applied to such multipoint shooting, the two-channel structure, or the structure including the L channel and the R channel, and the processing for the two-channel structure are only required to be replaced with the structure corresponding to the number of cameras used and the processing for such multiple-channel structure. In this case, the synchronization control section 10 controls the plurality of recording units corresponding in one-to-one to the plurality of cameras.

In the present embodiment, the management information file may be in binary data format, or in XML (eXtensible Markup Language), which is one of markup languages, or in text format.

Although the present embodiment describes the case in which a management information file for video data (a clip information file) is recorded separately from a file containing the main video data (a clip AV stream file), the management information for video data may be multiplexed in the file containing the video data and recorded together with the video data. For example, the management information file may be recorded in the header of the file containing the video data.

Second Embodiment

A video reproducing apparatus 2 according to a second embodiment of the present invention will be described. In the present embodiment, the operation of the video reproducing apparatus 2 that reproduces content data recorded by the video recording apparatus 1 of the first embodiment will be described. Although the video reproducing apparatus 2 is separate from the video recording apparatus 1 for ease of explanation, the functions of the video reproducing apparatus 2 may be added to the video recording apparatus 1 of the first embodiment. The terms described in the first embodiment are also used in the second embodiment.

1. Structure of Video Reproducing Apparatus

Figure 12:
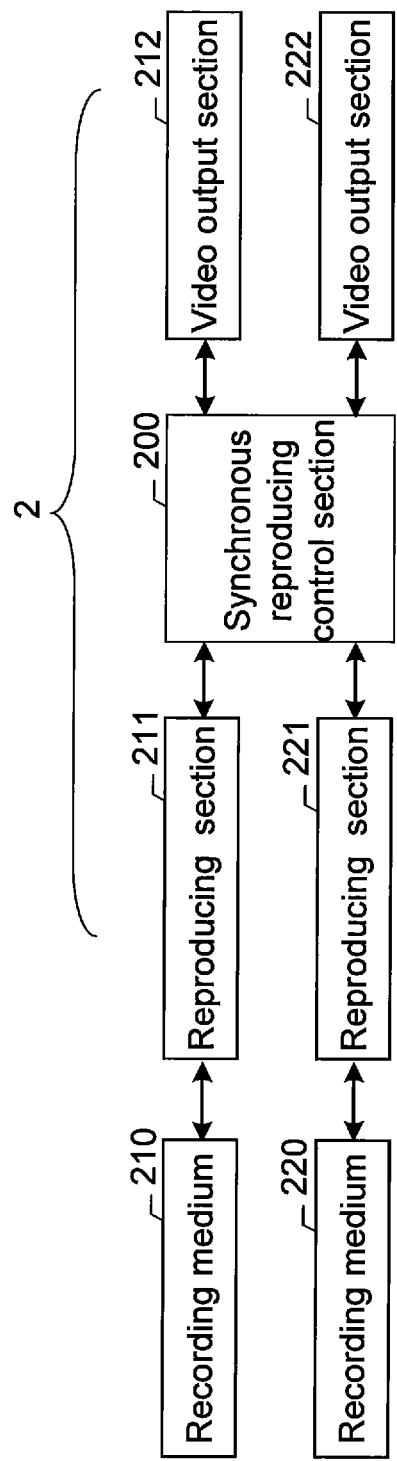
FIG. 12 is a block diagram showing the structure of a video reproducing apparatus according to a second embodiment.

FIG. 12 is a block diagram showing the structure of the video reproducing apparatus 2 of the present embodiment. The video reproducing apparatus 2 includes a synchronous reproducing control section 200, two reproducing sections 211 and 221, and two video output sections 212 and 222. The reproducing section 211 is connected to the recording medium 210, and the reproducing section 221 is connected to the recording medium 220. The recording media 210 and 220 may be removable from the video reproducing apparatus 2, or may be built in the video reproducing apparatus 2.

The synchronous reproducing control section 200 searches for the association between materials to obtain materials that correspond to each other (association search). The synchronous reproducing control section 200 controls the reproducing sections 211 and 221 to reproduce a plurality of pieces of video data in synchronization with each other. More specifically, the synchronous reproducing control section 200 in the present embodiment provides a reproducing start command or a reproducing stop command at the same timing to the reproducing sections 211 and 221. The specific processing for the association search will be described later. In another embodiment, the synchronous reproducing control section 200 may perform synchronous reproduction (adjustment) of a plurality of output videos using, for example, frame memories. The synchronous reproducing control is a commonly known technique, and will not be described in detail.

The recording media 210 and 220 store materials that have been recorded by the video recording apparatus 1. More specifically, the recording media 210 and 220 correspond to the recording media 133 and 143 in the first embodiment shown in FIG. 1.

When receiving a reproducing start command from the synchronous reproducing control section 200, the reproducing sections 211 and 221 reproduce video data based on files recorded on the recording media 210 and 220 (for example, PlayList files and clip information files). The reproducing sections 211 and 221 provide the video data reproduced via the synchronous reproducing control section 200 to the video output sections 212 and 222. The reproduction processing performed by the reproducing sections 211 and 221 is a commonly used technique, and will not be described in detail.

The video output section 212 outputs video data provided from the reproducing section 211, and the video output section 222 outputs video data provided from the reproducing section 221. For example, the video output sections 212 and 222 may output video data using HDMI (High Definition Multimedia Interface) commonly available for consumer use, or using HD-SDI (High Definition Serial Digital Interface) commonly available for professional use, which is standardized based on SMPTE-292M (SMPTE: Society of Motion Picture and Television Engineers).

2. Reproducing Operation

The reproducing operation performed by the video reproducing apparatus 2 with the above-described structure will now be described. The video reproducing apparatus 2 reproduces 3D materials that have been recorded by the video recording apparatus 1 of the first embodiment. The reproduction of AV stream data is a commonly known technique, and will not be described in detail. The association search, which is unique to the video reproducing apparatus 2, will be described in detail.

2.1 Association Search

When video data is reproduced, the synchronous reproducing control section 200 searches the recording layers sequentially from the upper layer to the lower layer for materials that correspond to each other (the association search). The association search is the processing for examining the status of association between a plurality of pieces of video data obtained through different channels (determining whether the pieces of video data are associated with each other). In the present embodiment, the association search is performed in each of the plurality of recording layers independently. This reduces unnecessary searching, and enhances searching efficiency.

Figure 13:
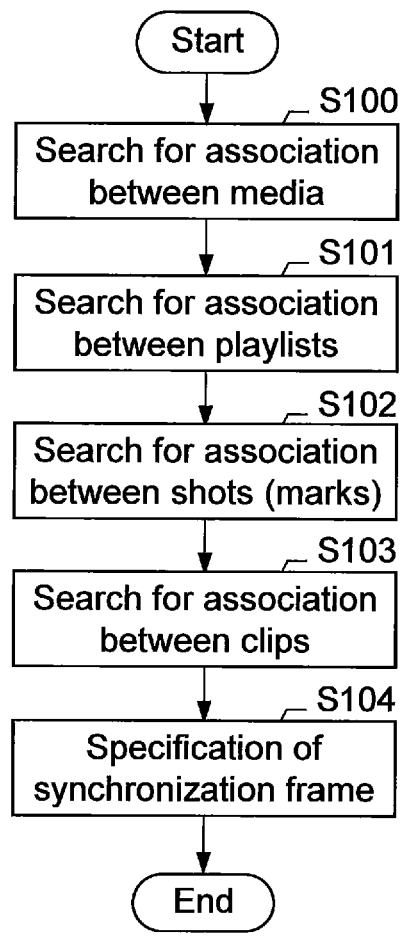
FIG. 13 is a flowchart showing an association search process performed in the second embodiment.

FIG. 13 is a flowchart showing the association search process. In step S100, the search is performed for association between media (between index files). In step S101, the search is performed for association between playlists (between PlayList files). In step S102, the search is performed between shots (between marks included in the PlayList files). In step S103, the search is performed between clips (between clip information files and between clip AV stream files). In step S104, the correspondence between the associated pieces of clip AV stream data (between frames) is examined to specify synchronization frames included in the clip AV stream data.

Under AVCHD format used in the present embodiment, clip information files and clip AV stream files are managed in one-to-one correspondence. In another embodiment, the synchronous reproducing control section 200 may perform the association search only for the clip information files or only for the clip AV stream files.

In another embodiment, the synchronous reproducing control section 200 may start the association search from the processing midway in the flowchart shown in FIG. 13. In this case, however, unnecessary searching may be performed when the set recording media fail to correspond to each other. This would lower the efficiency of the entire association search process. In the present embodiment, the association search is started from the processing in step S100. In this case, unnecessary searching is not performed. When the set recording media fail to correspond to each other, for example, the synchronous reproducing control section 200 in the present embodiment detects that the set recording media fail to correspond to each other in the search for association between media performed in step S100, and thereafter terminates the processing.

In the present embodiment, the association search is performed using two association search methods: a first association search method and a second association search method, which respectively correspond to the two association methods described above. With the first association search method, the search is performed for materials that have been associated with each other with the first association method. With the second association search method, the search is performed for materials that have been associated with each other with the second association method. The first and second association search methods will now be described.

2.2.1 First Association Search Method

The association search process in which the recording layers are searched sequentially from the upper layer to the lower layer with the first association search method, and the reproducing control process will now be described. The search for association between media, or the processing in step S100 in FIG. 13, and the search for association between playlists, or the processing in step S101, will be described first.

In the association search between media performed in step S100, the values of the media material IDs added to the index files that have been recorded onto the recording media 210 and 220 are compared with each other to determine whether the values are identical. When the values are identical, the synchronous reproducing control section 200 determines that the recording media 210 and 220 correspond to each other, and advances to the processing in step S101. When the values are not identical, the synchronous reproducing control section 200 determines that the recording media 210 and 220 do not correspond to each other, and controls the video output sections 212 and 222 to display, for example, a warning message indicating the need for replacing one or both of the recording media as necessary.

In the association search between playlists performed in step S101, the values of the playlist material IDs added to the PlayList files that have been recorded on the two recording media 210 and 220 are compared with each other in the same manner as for the media to determine whether the values are identical. When detecting any pair of playlist material IDs having the same value, the synchronous reproducing control section 200 determines that the PlayList file having the detected ID recorded on the recording medium 210 and the PlayList file having the detected ID recorded on the recording medium 220 are the PlayList files that correspond to each other, and advances to the next step (the association search between shots in step S102). When detecting no pair of playlist material IDs having the same value, the synchronous reproducing control section 200 determines that the set recording media do not correspond to each other, and controls the video output sections 212 and 222 to display, for example, a warning message indicating the need for replacing one or both of the recording media as necessary. Each of the recording media 210 and 220 may store a plurality of PlayList files. When each of the recording media 210 and 220 stores a plurality of PlayList files, the synchronous reproducing control section 200 compares each of a plurality of playlist material IDs added to the plurality of PlayList files that have been recorded on the recording medium 210 with a plurality of playlist material IDs added to the plurality of PlayList files that have been recorded on the recording medium 220.

Figure 14:
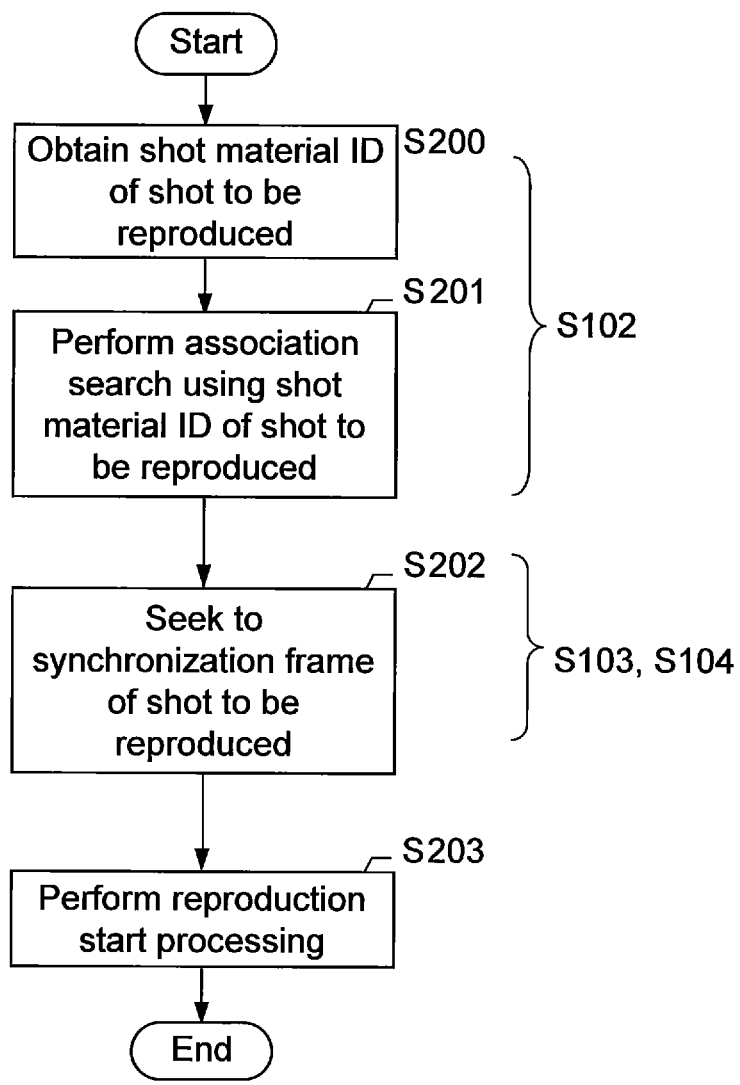
FIG. 14 is a flowchart showing a reproducing process performed in the second embodiment.

The search for association between shots, or the processing in step S102 in FIG. 13, and the reproducing control will now be described in detail. FIG. 14 shows the association search process performed with the first association search method and the processing performed when the reproduction is started.

In step S200, the synchronous reproducing control section 200 obtains a Shot material ID added to a shot (Shot) that the user intends to reproduce. The specific processing performed in this step will be described later.

In step S201, the synchronous reproducing control section 200 performs the association search using the Shot material ID obtained in step S200. In the association search performed using the Shot material ID, the Shot material ID values of the shots included in the playlists (marks in the playlists) that have been determined to correspond to each other through the association search between playlists are compared with each other to determine whether the values are identical. When detecting any pair of Shot material IDs having the same value, the synchronous reproducing control section 200 determines that the two shots corresponding to the two Shot material IDs in the detected pair correspond to each other. When detecting no pair of Shot material IDs having the same value, the synchronous reproducing control section 200 determines that no shots that correspond to each other are recorded on the recording media. Each PlayList file may include a plurality of marks indicating a plurality of shots. When the PlayList file includes a plurality of marks indicating a plurality of shots, the synchronous reproducing control section 200 compares each of a plurality of Shot material IDs added to the plurality of PlayList files that have been recorded on the recording medium 210 with a plurality of Shot material IDs added to the plurality of PlayList files that have been recorded on the recording medium 220 to detect a pair of Shot material IDs having the same value. The processing performed in steps S200 and S201 corresponds to the association search between shots performed in step S102 of FIG. 13. From another point of view, the processing in step S201 is the determination as to whether each of the playlists that correspond to each other includes the Shot material ID obtained in step S200. From still another point of view, the processing in step S201 is the search for the Shot material ID obtained in step S200 in each of the playlists that correspond to each other.

In step S202, the synchronous reproducing control section 200 performs seek to synchronization frames included in the clip AV streams that have been recorded to be associated with each other. More specifically, the synchronous reproducing control section 200 performs seek to a synchronization frame arranged at the start of a shot that the user intends to reproduce. The synchronization frame is arranged at the start of a shot. Thus, the synchronization frames can be specified by detecting the association between shots through the association search between shots. In the present embodiment, however, the association search is performed between clips in the same manner as the association search performed between shots. The association search between clips differs from the association search between shots only in that its search target is a clip material ID and a stream material ID instead of a Shot material ID. The processing in step S202 corresponds to the association search between clips performed in step S103 and the synchronization frame specification performed in step S104 in FIG. 13.

In step S203, the synchronous reproducing control section 200 performs the processing for starting reproduction of clip AV streams that are recorded separately onto the plurality of recording media 210 and 220 and that correspond to each other. As a result, the reproduction is started from the synchronization frames to which seek is performed in step S202.

The clip AV stream data is thereafter reproduced sequentially as clip AV stream files based on the PlayList files and the clip information files.

In another embodiment, the association search between clips may be eliminated. Under AVCHD format that is applied to the present embodiment, each clip is associated with a shot in addition to the association between clips using the material IDs. In this case, clip AV streams to be reproduced can be specified only through the association search performed between shots. Thus, the association search between clips may be eliminated.

Figure 15:
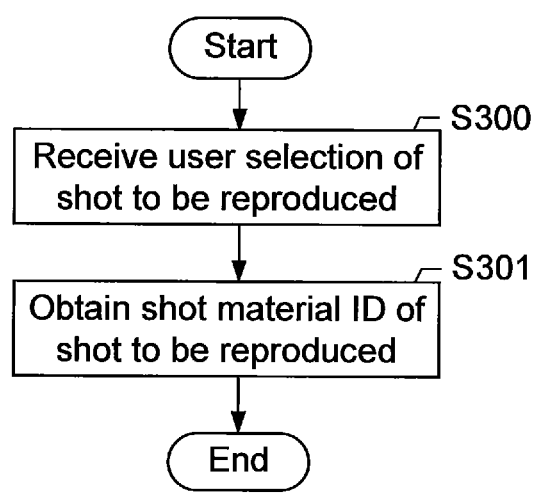
FIG. 15 is a flowchart showing a material ID obtaining process performed in the second embodiment.

The processing for obtaining a material ID in step S200 will now be described in detail with reference to FIG. 15. In step S300, an operation input unit (not shown) included in the video reproducing apparatus 2 receives selection of a shot that the user intends to reproduce via, for example, a screen displaying thumbnail images. In step S301, the synchronous reproducing control section 200 obtains a Shot material ID that is added to the shot selected in step S300.

Through the processing described above, the user can select a shot that the user intends to reproduce, and consequently the AV stream data for the shot is reproduced. Although the user selection is performed in units of shots in the above example, the user selection may be performed in units of playlists or in units of clips. When the user selects a playlist or a clip, the same processing as the processing for a shot described in the flowchart of FIG. 14 is performed for the playlist or for the clip.

2.1.2 Second Association Search Method

The second association search method used for a plurality of pieces of video data that have been associated with each other for the recording media 210 and 220 using the second association method will now be described. Index files have the same file name for the two recording media 210 and 220. Movie object files also have the same file name for the two recoding media 210 and 220. The synchronous reproducing control section 200 determines whether the file names of index files recorded on the recording media 210 and 220 are identical, and whether the file names of movie object files recorded on the recording media 210 and 220 are identical. When the file names are identical, the synchronous reproducing control section 200 determines that the files correspond to each other. When the file names are not identical, the synchronous reproducing control section 200 determines that the files do not correspond to each other. Two playlists that correspond to each other have the same file name. Thus, the synchronous reproducing control section 200 searches the recording media 210 and 220 that have been determined to correspond to each other for PlayList files having the same file name. The file names of clip information files and the file names of clip AV stream files are generated based on the rules described above. Thus, the synchronous reproducing control section 200 searches for files having file names that correspond to each other based on the above rules. For example, the synchronous reproducing control section 200 may search for a pair of files having file names whose lower four-digit numbers are identical, from the clip information files that have been recorded on the two recording media 210 and 220. For example, the synchronous reproducing control section 200 may determine that the files having the file names "00000.dpi" and "10000.clpi" correspond to each other, and the files having the file names "00000.m2ts" and "10000.m2ts" correspond to each other.

Although the present embodiment describes the two association search methods that are used separately, the first and second association search methods may be used in combination in each step for performing the association search in FIG. 13. When a plurality of pieces of video data have been associated with each other using both the first association method and the second association method, the search for association between media is preferably performed using the first association search method. This is because AVCHD format defines a file name "index.bdmv" for an index file.

Although the present embodiment describes the case in which materials obtained through two channels in 3D shooting are associated with each other, the present invention may be applied to more than two recording media, or to materials obtained through more than two channels. When the present invention is applied to such multiple recording media or multiple-channel materials, the processing performed for two channels (L channel and R channel) is only required to be performed for more than two channels.

FEATURES

The technology common to the first and second embodiments enables a plurality of data elements (materials) included in each of at least two layers of a data structure to be associated with each other for different channels when the data structure contains a plurality of channels of video data. As a result, the technology disclosed herein enables a plurality of data elements (materials) to be easily associated with each other for different channels when a plurality of channels of video data is reproduced. This enables, for example, data elements (materials) that correspond to each other to be specified efficiently from the data structure containing a plurality of channels of video data, and enables the plurality of channels of video data to be reproduced efficiently in synchronization with each other.

INDUSTRIAL APPLICABILITY

The video recording apparatus of the present embodiment, which processes a plurality of pieces of video data at the same time, significantly improves user convenience. The technology described herein is widely applicable to a video recording apparatus that has a semiconductor memory or an optical disc, a 3D video recording apparatus that displays a two point stereo image, or a multi-camera system that shoots using a plurality of cameras.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a video recording apparatus and a video reproducing apparatus. Accordingly, these terms, as utilized to describe the present invention should be interpreted relative to a video recording apparatus and a video reproducing apparatus.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A video recording apparatus configured to record, onto a recording medium, a layered data structure containing a group of data elements, each of the data elements including video data or management information for the video data, and the layer data structure being separated into layers depending on the data elements, the apparatus comprising:
    an input unit configured to receive a plurality of channels of the video data, the plurality of channels corresponding to each other;
    an information generation unit configured to generate association information to be added to each of the data elements in at least two layers in the layered data structure such that one of the data elements in one layer of the layered data structure for one of the plurality of channels of the video data is associated with a corresponding one of the data elements in a corresponding layer of the layered structure for the other one of the plurality of channels of the video data;
    an adding unit configured to add the association information to each of the data elements in the at least two layers of the layered data structure; and
    a recording unit configured to record, onto the recording medium, the layered data structure in which the association information has been added to the each of the data elements;
    wherein the information generation unit is configured to generate the file name with a number including a first part and a second part, the first part being a number common to file names of a plurality of data files for corresponding ones of the data elements between the layered data structure for one of the plurality of channels of the video data and the layered data structure for the other one of the plurality of channels of the video data, and the second part being a number that differs among the file names of the plurality of data files for the corresponding ones of the data elements between the layered data structure for the one of the plurality of channels of the video data and the layered data structure for the other one of the plurality of channels of the video data.

2. The video recording apparatus according to claim 1, wherein the layered data structure includes a layer corresponding to a medium, a layer corresponding to a playlist, and a layer corresponding to a clip, and
    the recording unit is configured to record, onto the recording medium, the layered structure in a form of a file generated for each of the layer corresponding to a medium, the layer corresponding to a playlist, and the layer corresponding to a clip.

3. The video recording apparatus according to claim 1, wherein the information generation unit is configured to generate, as the association information, identification information that identifies each of the data elements at least for a same channel, in at least one of the at least two layers.

4. The video recording apparatus according to claim 1, wherein a group of the data elements includes a mark indicating a predetermined position on a time axis of the video data, and
    the information generation unit is configured to generate the association information to be added to the mark.

5. The video recording apparatus according to claim 1, wherein the group of the data elements includes a data file, and
    the information generation unit is configured to generate, as the association information, a file name of the data file in at least one of the at least two layers.

6. The video recording apparatus according to claim 1, wherein the recording medium includes a plurality of storages, and
    the recording unit is configured to record the layered data structure onto the plurality of storages in a manner that each of the plurality of channels of the data elements is recorded onto a different one of the plurality of storages.

7. The video recording apparatus according to claim 1, wherein the adding unit is configured to associate one of the data elements in one layer of the layered data structure for one of the plurality of channels of the video data with a corresponding one of the data elements in a corresponding layer of the layered structure for the other one of the plurality of channels of the video data by adding, in a synchronized manner, the same association information to the one of the data elements and the corresponding one of the data elements.

8. The video recording apparatus according to claim 1, wherein the plurality of channels of the video data include video data for a left eye and video data for a right eye.

9. The video recording apparatus according to claim 8, wherein the video recording apparatus is a 3D video recording apparatus configured to perform recording of 3D video data.

10. A video reproducing apparatus configured to perform reproduction of a recording medium storing a layered data structure containing a group of data elements, each of the data elements including video data or management information for the video data, and the layer data structure being separated into layers depending on the data elements, the apparatus comprising:
    a reproducing unit configured to reproduce a plurality of channels of the video data, the plurality of channels corresponding to each other; and
    a synchronous reproducing control unit configured to search each one of at least two layers in the layered data structure sequentially from an upper layer to a lower layer to determine a correspondence between the data elements in corresponding layers of the layered data structures for the plurality of channels of the video data and control the reproducing unit to reproduce the plurality of channels of the video data in a synchronized manner based on the determined correspondence;

wherein the synchronous reproducing control unit is configured to determine the correspondence between the data elements in the corresponding layers of the layered data structures for the plurality of channels of the video data by comparing association information included in each of the data elements, the association information identifying one of the data elements in one layer of the layered data structure for one of the plurality of channels of the video data as being associated with a corresponding one of the data elements in a corresponding layer of the layered structure for the other one of the plurality of channels of the video data; and wherein the file name has a number including a first part and a second part, the first part being a number common to file names of a plurality of data files for corresponding ones of the data elements between the layered data structure for one of the plurality of channels of the video data and the layered data structure for the other one of the plurality of channels of the video data, and the second part being a number that differs among the file names of the plurality of data files for the corresponding ones of the data elements between the layered data structure for the one of the plurality of channels of the video data and the layered data structure for the other one of the plurality of channels of the video data.

11. The video reproducing apparatus according to claim 10, wherein the plurality of channels of the video data include video data for a left eye and video data for a right eye.

12. The video reproducing apparatus according to claim 11, wherein the video reproducing apparatus is a 3D video reproducing apparatus configured to perform reproducing of 3D video data.

13. The video reproducing apparatus according to claim 10, wherein the group of the data elements includes a data file, and the association information is a file name of the data file in at least one of the at least two layers.

* * * * *